Aug. 27, 1968 B. S. BROWN 3,399,324
TELEVISION CAMERA CIRCUITS
Filed Feb. 9, 1965
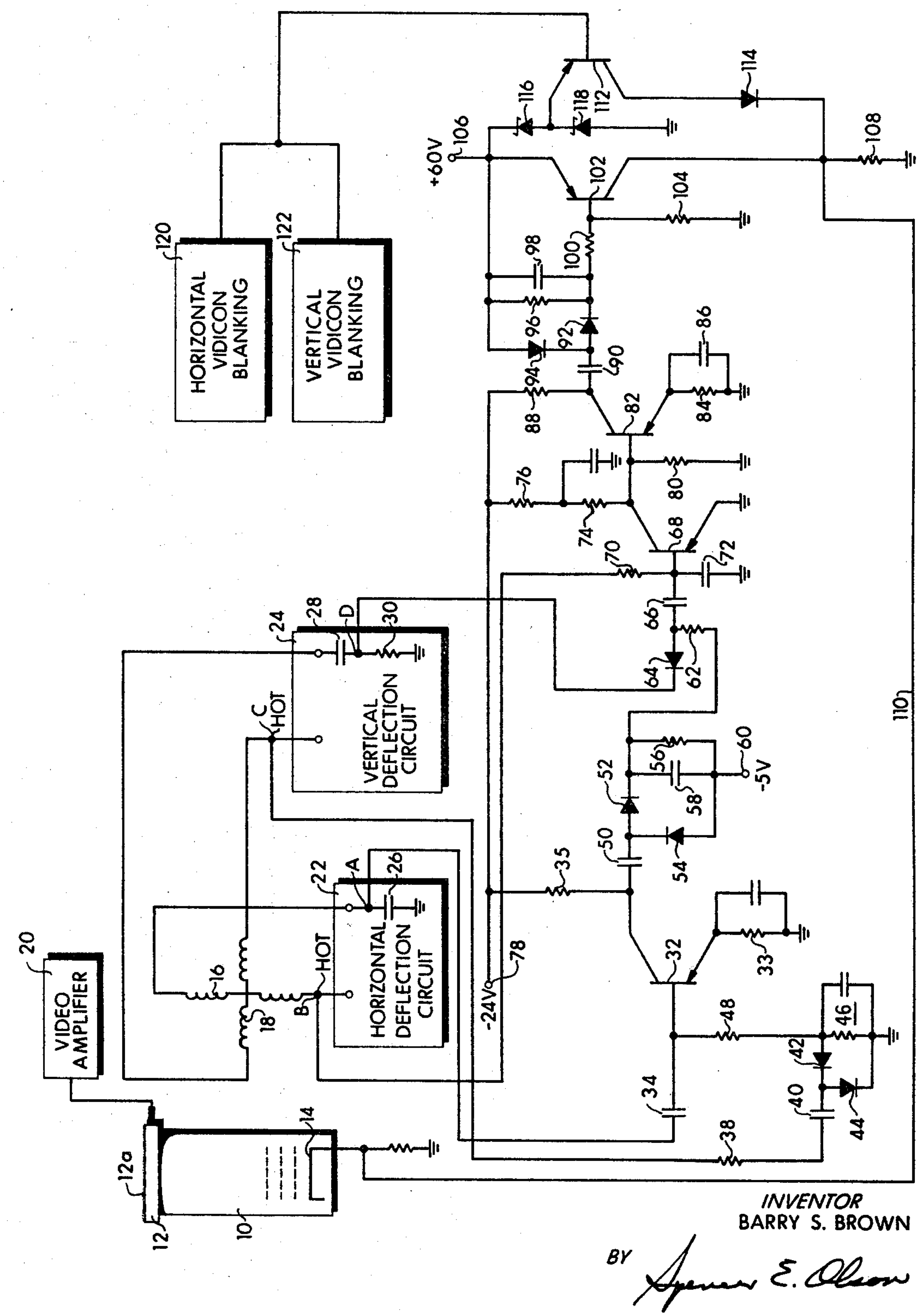
INVENTOR
BARRY S. BROWN
BY Spencer E. Olson
ATTORNEY United States Patent Office 3,399,324
Patented Aug. 27, 1968

3,399,324

TELEVISION CAMERA CIRCUITS

Barry S. Brown, Batavia, N.Y., assignor to Sylvania Electric Products Inc., a corporation of Delaware Filed Feb. 9, 1965, Ser. No. 431,405
3 Claims. (Cl. 315—20)

ABSTRACT OF THE DISCLOSURE

A beam scanning tube protection circuit employs sensors to directly monitor the current and voltages associated with the deflection coils of the tube. The circuit converts the current and voltage thus monitored into a blanking signal in the event of an open or a short circuit in the deflection coils.

This invention relates to television camera circuits and more particularly to a scan failure protection circuit for a photoconductive type of camera tube.

A photoconductive camera tube, of which the Vidicon is a widely used type, usually comprises a signal electrode, a layer of photoconductive material on the signal electrode, an electron-emitting cathode and means including an accelerating electrode maintained at a positive potential relative to the cathode for inducing flow of electrons in a beam to the photoconductive layer. Suitable deflection means, usually magnetic, are coupled to the tube to cause the electron beam to scan the photoconductive layer. In the operation of such a tube, an image is focused on the photoconductive layer and the beam is caused to scan the layer. Since the Vidicon represents a substantial portion of the cost of a television camera, it is essential that the Vidicon beam be turned off in the event of failure of either the vertical or horizontal scan, since the photoconductive material on the signal electrode can be destroyed in a few milliseconds by repetitive sweeps falling on the same place on the photoconductive material.

Scan failure protection circuits heretofore available suffer the disadvantage that they are responsive only to an apparent loss of sweep voltage; i.e., they are voltage-sensitive only and are ineffective to protect the Vidicon in the event of certain types of failure. For example, when an open circuit occurs in the yoke, or in the yoke leads, most scan circuits continue to operate near normal, supplying voltage waveforms; a protection circuit responsive to the presence or absence of the waveform is incapable of indicating that there is a lack of current flow, and hence lack of a scanning field, in the open yoke.

It is a principal object of this invention to provide a circuit for protecting an image pickup tube, such as a Vidicon, from damage in the event of scan failure.

Another object of the present invention is to provide a circuit for protecting a Vidicon for all types of scan failure, including open or shorted yokes and yoke leads shorted to ground.

Another object of the invention is to provide a scan failure protection circuit that is substantially fail safe within the limits of practical economics, such that when a component failure occurs within the protection circuitry itself, the Vidicon is protected or a visual indication given by the performance of the camera to alert the operator that a failure has occurred.

Briefly, these objects are attained by a circuit which is both current and voltage sensitive so as to protect against any type of failure. Its sensitivity to current immediately detects the absence of scan current which would result from an open yoke or yoke lead, and the voltage sensing capability detects the decrease in scan voltage that would occur in the event of a shorted yoke, a condition in which current might flow in the yoke and thus not activate the current-sensitive portion of the system. Full Vidicon protection is achieved by detecting both the voltage and current of both the horizontal and vertical scan system, which under normal conditions develops a control signal which is operative to keep a Vidicon protection transistor turned off. When any of the four inputs is absent, the control signal decreases to zero, turning the Vidicon protection transistor on and applying a blanking voltage to the Vidicon.

Other objects, features and advantages of the invention, and a better understanding of its construction and operation, will be apparent from the following detailed description take in conjunction with the accompanying drawing, the single figure of which is a schematic diagram of a television camera scan failure protection circuit constructed according to the principles of the invention.

Referring to the drawing, reference numeral 10 designates a television camera tube of the Vidicon type having a signal electrode or target 12 on which a photoconductive material 12*a* is deposited, an electron-emitting cathode 14 and a pair of deflection coils 16 and 18.

In operation, an image is focused on the photoconductive layer 12*a* of the target 12 and an electron beam produced by the cathode 14 and affected by the other grids of the tube is caused to scan the target 12 by applying suitable sweep currents to the deflection coils 16 and 18. At any instant, the electron current flow from the beam to the target electrode 12 is proportional to the light intensity of the point at which the beam is that instant focused, and there is thus produced a video signal at the target 12. This video signal is amplified by a suitable video amplifier of conventional form, shown diagrammatically in block form at 20.

The horizontal deflection coils 16 and vertical deflection coils 18 are respectively connected to horizontal and vertical deflection circuits 22 and 24 which may be of conventional form to produce deflection currents of sawtooth waveform in the coils. One terminal of the horizontal coils 16 is connected to the "hot" terminal of the deflection circuit 22 and the other terminal of the series connected coil 16 is connected to ground through a bypass capacitor 26. The voltage developed across the effective series resistance of capacitor 26 provides an indication of horizontal scan current. The effective series resistance of the capacitor is used in preference to a resistor in series with the capacitor because the inherent low resistance of the horizontal yoke circuit cannot tolerate the addition of significant resistance. To repeat, horizontal scan current is detected at point A, and horizontal scan voltage is detected at point B, the "hot" terminal of the horizontal deflection circuit.

Similarly, vertical scan voltage is detected at the "hot" terminal of vertical deflection circuit 24 (designated point C), and vertical scan current detection is achieved by returning the "cold" side of the vertical deflection coils through capacitor 28 and series resistor 30 to ground. The voltage developed across resistor 30 due to vertical scan current is detected at point D and provides one of the inputs to the scan failure protection circuit now to be described.

The horizontal sawtooth voltage developed across capacitor 26 at the return side of the horizontal yoke coil 16 is coupled to a transistor amplifier 32 through capacitor 34. The emitter of transistor is connected to ground through by-passed resistor 33, and the collector is connected via resistor 35 to a source of negative potential, represented by terminal 78. During normal operation, amplifier 32 is biased on by a biasing voltage derived from the sawtooth voltage appearing at the "hot" side (point C) of the vertical deflection circuit. More specifically, point C is connected via resistor 38 and capacitor 40 to the junction of a pair of oppositely poled diodes 42 and 44. The 60 cycles per second sawtooth pulses appearing at point C during normal operation are detected by diodes 42 and 44 and develop a DC potential across filter 46, which is applied via resistor 48 to the base of transistor 32 to turn it on.

With transistor 32 turned on, the horizontal sawtooth voltage pulses appearing at point A are amplified and coupled through capacitor 50 to the junction of a second pair of oppositely poled diodes 52 and 54 connected in a series loop with resistor 56. A smoothing capacitor 58 is connected in parallel with resistor 56, and the junction of diode 54, resistor 56 and capacitor 58 is connected to a source of negative potential represented by terminal 60. The amplified pulses are detected by diodes 52 and 54 to develop a direct current control signal across resistor 56 for application via resistor 62 to a subsequent stage.

From the description thus far, it will be evident that the absence of vertical scan voltage would prevent transistor 32 from being turned on with the consequence that horizontal scan sawtooth pulses would not be amplified or detected and no potential would be developed across resistor 56. Similarly, if the vertical scan voltage is present to bias transistor 32 on, and there were no sawtooth voltage pulses developed across capacitor 26, indicating absence of horizontal scan current, there would be no pulses to be detected by diodes 52 and 54 and again there would be no voltage developed across resistor 56. That is, if either the horizontal current-derived sawtooth or the bias developed from the voltage on the "hot" side of the vertical yoke is absent, the sawtooth is not amplified by transistor 32.

In normal operation, however, the sawtooth pulses amplified by transistor 32 are detected and the voltage developed across resistor 56 biases diode 64 into conduction. Current through resistor 30 in the return leg of the vertical yoke 18 develops a sawtooth voltage at point D which is aplied to diode 64, which if conducting, applies the sawtooth voltage via capacitor 66 to the base electrode of transistor amplifier 68. Voltage pulses from the "hot" side of the horizontal yoke 16 (point B) are also applied to the base electrode of transistor 68 through resistor 70, the voltage pulses being smoothed by capacitor 72 connected from the base electrode of transistor 68 to ground. This voltage biases transistor 68 on and allows the sawtooth pulses applied through diode 64 to be amplified. The collector of the grounded emitter amplifier 68 is connected through resistors 74 and 76 to a source of negative potential represented by terminal 78, through resistor 80 to ground, and to the base electrode of transistor amplifier 82. The emitter of transistor 82 is connected to ground by the parallel combination of resistor 84 and capacitor 86, and the collector is connected to potential source 78 through resistor 88. Transistor 82 is biased by transistor 68 and further amplifies the sawtooth signal applied through diode 64.

It will now be evident that during normal operation a train of amplified sawtooth pulses derived from point D appears at the collector of transistor 82, whereas the absence of a signal at either of points A, B, C or D results in the absence of the sawtooth pulse train at this point.

The sawtooth pulses appearing at the collector of transistor 82 during normal operation are coupled through capacitor 90 to the junction of a pair of oppositely poled diodes 92 and 94 connected in series with resistor 96. A smoothing capactior 98 is connected in parallel with resistor 96. The output of the just-described detection circuit is coupled through resistor 100 to the base electrode of Vidicon protection transistor 102, the base of which is also connected to ground through resistor 104. The emitter of transistor 102 is connected to a source of positive potential, for example, +60 volts, represented by terminal 106, and the collector is connected through resistor 108 to ground. The sawtooth voltage pulses appearing at the collector of transistor 82 are detected by diodes 92 and 94, The resultant detected voltage being operative to bias transistor 102 to the off condition. Thus, in normal operation transistor 102 is non-nonducting. However, if the signal is not present at any point in the vertical or horizontal voltage or current sensing circuit, the biasing voltage is absent and transistor 102 is turned on to saturation, whereby its collector is at the same potential as the emitter, namely, +60 volts. This potential is applied via conductor 110 to the cathode of the Vidicon 10 to turn off the Vidicon beam.

Normal Vidicon blanking is accomplished by application of mixed blanking signals to the base electrode of transistor 112, the collector of which is connected through diode 114 to the collector of transistor 102, and the emitter of which is connected to the junction of a pair of Zener diodes 116 and 118 connected in series between potential source 106 and ground. Horizontal and vertical blanking signals derived from other circuitry in the camera, shown diagrammatically as blocks 120 and 122, respectively, are mixed in a suitable network and applied to the base electrode of transistor 112. When the normally off transistor 112 is turned on by the horizontal and vertical blanking signals, a positive voltage obtained across Zener diode 118 is applied to the Vidicon cathode 14 via conductor 110. Diode 114 isolates the blanking circuit from Vidicon protection transistor 102.

From the foregoing it is apparent that applicant has provided a scan failure protection circuit which is both voltage- and current-sensitive and thus effective to protect the Vidicon in the event of all types of scan failure. The voltage and current sensing circuitry has an essentially AND logic organization in that voltage signals must be present at all four monitoring points to keep the protection transistor 102 turned off. Stated another way, the absence of a signal at one or more of points A, B, C and D results in the loss of turn-off bias for transistor 102 and the consequent application of a blanking signal to the cathode of Vidicon 10. Analysis has shown that the protection circuit is greater than 75% fail safe; that is, even if components in the protection circuitry fails, the Vidicon would still be protected for 75% of such component failures. Thus it is seen that a high degree of protection of the Vidicon is afforded with a relatively inexpensive protection circuit.

Although the invention has been disclosed and illustrated with reference to a particular application, the principles involved are susceptible of other applications and modifications which will now be apparent to persons skilled in the art. The invention is, therefore, to be limited only as indicated by the scope of the appended claims.

What is claimed is:

1. In combination, a pickup tube for developing video signals, said pickup tube having means for developing a beam of electrons and a light sensitive surface for receiving the beam, horizontal and vertical deflection coils coupled to said tube and means for generating current signals in said coils for controlling the motion of the beam in said tube, a normally non-conducting transistor, first and second voltage-sensing means respectively connected to said horizontal and vertical deflection coils to sense the voltage applied thereto, first and second current sensing means respectively connected to said horizontal and vertical deflection coils to monitor the flow of current in its respective coil, and means interconnecting said voltage and current sensing means and said normally non-conducting transistor and operative to cause conduction of said transistor and blanking of said tube when either the voltage or current in either of the vertical or horizontal deflection coils is absent.

2. In a television camera, a pickup tube for developing video signals, said pickup tube having means for developing a beam of electrons and a photosensitive surface for receiving the beam, means for generating vertical and horizontal sweep signals, horizontal and vertical deflection coils coupled to said tube and respectively connected to said means for generating horizontal and vertical sweep signals for introducing the generated signals to said tube for controlling the motion of the beam in said tube, and protection circuit means for blanking said tube when either the vertical or horizontal sweep voltages or horizontal or vertical sweep currents are absent, said protection circuit means comprising a normally non-conducting transistor having base, emitter and collector electrodes, a first transistor amplifier coupled to said horizontal deflection coil and operative to amplify pulses derived from the flow of current in said horizontal deflection coil only when voltage is applied to said vertical deflection coil from said vertical sweep signal generating means, a second transistor amplifier coupled to said vertical deflection coil and operative to amplify pulses derived from the flow of current in said vertical deflection coil only when said first amplifier is operative and voltage is applied to said horizontal deflection coil by said horizontal scan signal generating means, and means for applying the output of said second amplifier to the base electrode of said normally non-conducting transistor to normally bias it off, said normally non-conducting transistor being turned on in the absence of an output signal from said second transistor amplifier and operative to apply a blanking signal to said tube.

3. In a television camera including a pickup tube for developing video signals, said pickup tube having means for developing a beam of electrons and a light sensitive surface for receiving the beam, horizontal and vertical deflection coils coupled to said tube, horizontal and vertical deflection circuits respectively connected to said horizontal and vertical coils and operative to generate sweep voltage signals for causing currents of substantially sawtooth waveform to flow in said horizontal and vertical deflection coils for controlling the motion of the beam in said tube, a scan failure protection circuit for interrupting the beam when either the horizontal or vertical sweep voltages are absent or there is an absence of current in either of said horizontal or vertical deflection coils, said protection circuit comprising: a first transistor amplifier coupled to said horizontal deflection coil and operative when conducting to amplify pulses derived from the flow of current in said horizontal deflection coil, first pulse detecting means coupled to said vertical deflection coil and operative in response to the sweep voltage signals applied to said vertical deflection coil to apply a first biasing potential to said first transistor amplifier to cause it to conduct, second pulse detecting means connected to said first transistor amplifier and operative in response to the output of said first amplifier to produce a second biasing potential, a second transistor amplifier having input and output terminals, means coupling the sweep voltage signals applied to said horizontal deflection coil to the input terminal of said second amplifier and operative to bias said second amplifier into conduction, means including a diode for coupling to the input terminal of said second amplifier pulses derived from the flow of current in said vertical deflection coil, means for applying said second biasing potential to said diode to render said diode conducting, third pulse detecting means coupled to the output terminal of said second amplifier and operative in response to the output signals from said second amplifier to produce a third biasing potential, a transistor connected to said third pulse detecting means and normally biased off by said third biasing potential, and a connection from said transistor to said tube for applying a blanking signal to said tube in response to conduction of said transistor caused by the absence of said third biasing potential.

References Cited

UNITED STATES PATENTS

| | | | |
|---|---|---|---|
| 2,514,079 | 7/1950 | Lockhart | 315—20 |
| 2,584,932 | 2/1952 | Snyder et al. | 315—20 |
| 2,709,768 | 5/1955 | King | 315—20 |
| 2,882,445 | 4/1959 | Sprengeler et al. | 315—20 |

RODNEY D. BENNETT, *Primary Examiner.*

B. L. RIBANDO, *Assistant Examiner.*